United States Patent
Phaal

(10) Patent No.: US 6,819,656 B2
(45) Date of Patent: *Nov. 16, 2004

(54) SESSION BASED SCHEDULING SCHEME FOR INCREASING SERVER CAPACITY

(75) Inventor: Peter Phaal, San Francisco, CA (US)

(73) Assignee: Hewlett-Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/226,904

(22) Filed: Jan. 8, 1999

(65) Prior Publication Data

US 2003/0103463 A1 Jun. 5, 2003

(51) Int. Cl.$^7$ .................................................. G01R 31/08
(52) U.S. Cl. ...................................... 370/252; 370/230
(58) Field of Search ................................. 709/203, 227, 709/228, 229, 226; 370/229, 230, 230.1, 231, 232, 233, 234, 235

(56) References Cited

U.S. PATENT DOCUMENTS

| | | | | | |
|---|---|---|---|---|---|
| 5,872,771 | A | * | 2/1999 | Part et al. | 370/252 |
| 6,006,264 | A | * | 12/1999 | Colby et al. | 709/226 |
| 6,222,823 | B1 | * | 4/2001 | Smith et al. | 370/230 |
| 6,223,205 | B1 | * | 4/2001 | Harchol-Balter et al. | 709/105 |
| 6,360,270 | B1 | * | 3/2002 | Cherkasova et al. | 709/229 |

* cited by examiner

Primary Examiner—Alpus H. Hsu
Assistant Examiner—Thien D Tran

(57) ABSTRACT

A session based resource control system for a server including a resource controller that receives a stream of arriving messages from one or more clients targeted for the server. The resource controller relays to the server the messages and a corresponding resource share for each message as a stream of resource allocated messages. The resource share is based on the resource rate for that session as determined by a resource monitor. The server then processes each message in accordance with its resource share and generates a stream of completed messages. The objective is for the resource control system to achieve fairness whenever there is contention for resources between or amongst the sessions.

23 Claims, 4 Drawing Sheets

SESSION BASED SCHEDULING SCHEME FOR INCREASING SERVER CAPACITY

BACKGROUND OF THE INVENTION

1. Field of Invention

The present invention relates generally to the field of servers and pertains more particularly to a system for providing reliable client/server sessions by controlling the consumption of resources between or among arriving messages to a server.

2. Discussion of the Prior Art

Servers are commonly employed for sharing of information among large numbers of computer systems or similar devices. A computer system or similar device that communicates with a server is usually referred to as a client of the server and the server is often part of a host system. A client and a host typically exchange messages via a communication network using a predetermined protocol. Such protocols are usually arranged in a client/host model in which a requesting client transfers a request message to a host and the host in turn takes an appropriate action depending on the content of the request. Typically, the appropriate action for the request includes the transfer of a response message to the requesting client.

Prior protocols typically do not allow for the establishment of a persistent session between the client and the host in the traditional sense in which a local terminal establishes a session on a computer system. Instead, any session-like information is usually implied in the content of the messages exchanged between the client and the host. Such a communication protocol may be referred to as a "stateless" protocol. Such stateless protocols include protocols associated with Internet communication including the Internet Protocol (IP), the User Datagram Protocol (UDP), the Simple Mail Transfer Protocol (SMTP), and the Hypertext Transfer Protocol (HTTP), as well as the Network File System (NFS) Protocol.

A client that accesses a host commonly engages in an extended transaction with the host. Such an extended transaction typically involves the exchange of multiple messages between the client and the host. For example, an NFS client typically issues multiple request messages to an NFS server while retrieving a file from the NFS server. Similarly, an HTTP client typically issues multiple request messages to an HTTP server while browsing through web pages contained on the HTTP server. Such transactions that involve the exchange of multiple messages between a client and a server are hereinafter referred to as sessions.

Servers commonly have a large pool of potential clients which may issue request messages. For example, an HTTP server connected to the world-wide-web has potentially millions of clients from which it may receive requests. Prior servers that are adapted for stateless protocols typically respond to each request in the order in which it is received, that is, on a first-come-first-served basis regardless of the source of the request.

In the present context, the term "quality of service" refers to the ability of a host both to provide quick response to a request message and to complete an entire session. As a particular host becomes more popular, and due to that popularity receives more requests, the processing resources of the host can become stretched. For example, due to heavy traffic, a host may not be able to respond to a request at all, or the host may not provide a timely response which can cause a client to "time-out" and generate an error. Poor quality of service can have significant results, as users may become frustrated and simply give up trying to reach a particular host, or more significantly, the sponsor of the host may lose sales or fail to communicate needed information to any or all clients.

Two techniques are generally used to alleviate quality of service problems. First, more processing capacity can be added to the host, typically by either replacing the host with another, more powerful computer, or by providing multiple computers in parallel and delegating new request messages to different ones of the multiple computers. While this first technique presents an effective way of reducing some quality of service problems, it is not always practical. For example, sometimes, due to inadequate planning, budgetary constraints or space constraints, additional processing capacity simply cannot be added. Other times, if demand for a host is not properly forecast, there may be a long lead time before additional processing capacity can be purchased and implemented.

A second technique calls for applying "admission control," where only a certain set number of client request messages are processed ("admitted") and the remainder are refused. Of the requests which are in fact admitted, all are ideally handled in an expedient manner without degradation of quality of service as to those admitted requests. An advantage of this technique is that admission control can be implemented in software, thus facilitating quick, inexpensive use with little advance notice. Unfortunately, typical admission control mechanisms operate by admitting messages on a message-by-message basis, and so, these typical admission control techniques do not provide an adequate solution for multiple-message sessions. Also, the requests which are not admitted to the host are generally not handled at all, such that a client is not informed that the request has been refused or the client, if informed, is simply asked to "try again later." Typically, a refused client must try repeatedly to obtain service with no guarantee that future requests will be processed. For these reasons and others, techniques generally used to alleviate quality of service problems are not always successful.

A definite need exists for a resource control system having an ability to alleviate quality of service problems. In particular, a need exists for a resource control system which responds to all request messages based on their relationship to new or existing sessions. Ideally, such a system would operate by fairly sharing resources amongst the sessions when there is a contention for those resources. With a system of this type, resource control would provide a reliable means of finishing more sessions with high quality of service. A primary purpose of present invention is to solve these needs and provide farther, related advantages.

SUMMARY OF THE INVENTION

A session based resource control system for a server is disclosed including a resource controller that receives a stream of arriving messages from one or more clients targeted for the server. The resource controller relays to the server the messages and a corresponding resource share for each message as a stream of resource allocated messages. The resource share is based on the resource rate for that session as determined by a resource monitor. The server then processes each message in accordance with its resource share and generates a stream of completed messages. The objective is for the resource control system to achieve fairness whenever there is contention for resources between or amongst the sessions.

BRIEF DESCRIPTION OF THE DRAWING

The above and other objects and advantages of the present invention will be more readily appreciated from the following detailed description when read in conjunction with the accompanying drawing, wherein.

DETAILED DESCRIPTION OF THE PREFERRED EMBODIMENTS

Figure 1:
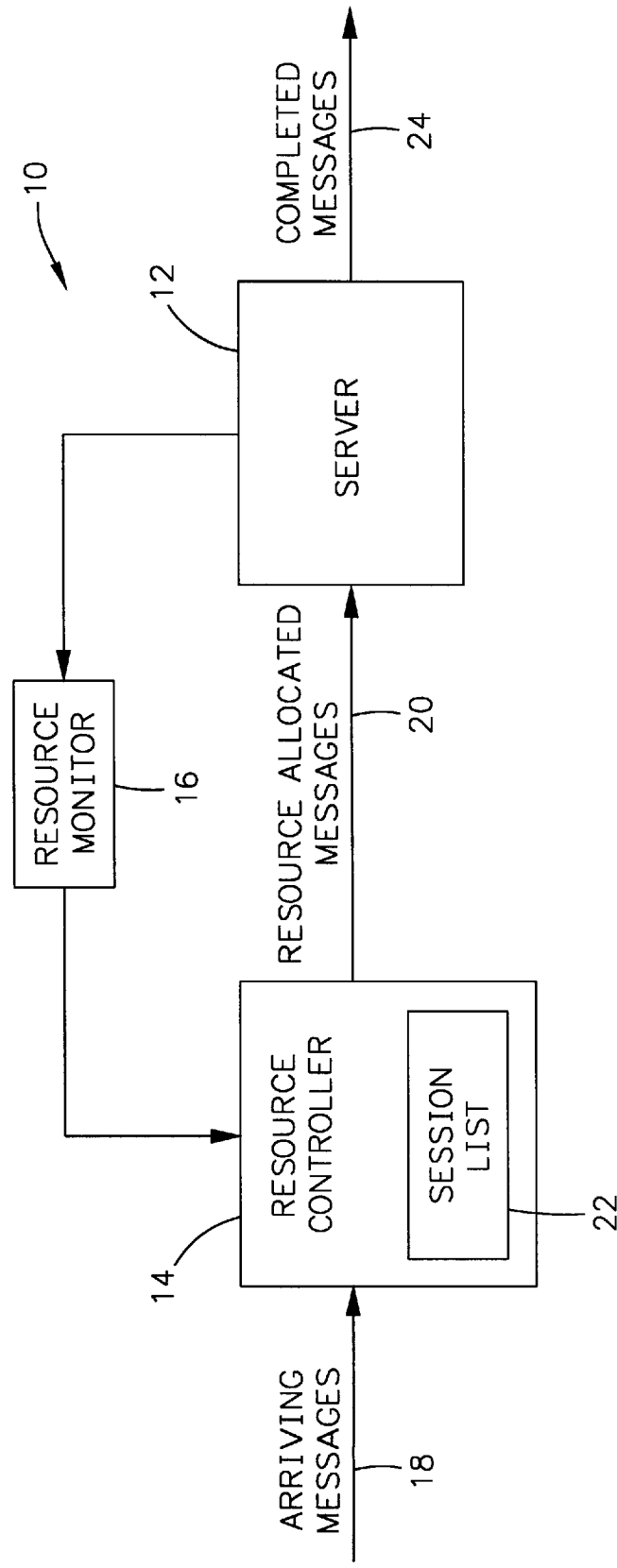
FIG. 1 is a block diagram of a resource control system that provides reliable sessions between clients and a server.

A purpose of the present invention is to provide improved quality of service of a server through resource control strategies. Turning first to FIG. 1, a block diagram of a resource control system 10 that provides reliable sessions between clients (not shown) and a server 12 is shown. The resource control system 10 includes the server 12, a resource controller 14, and a resource monitor 16. Those of ordinary skill in the art will realize that either or both of the resource controller 14 and the resource monitor 16 may be integral to the server 12 rather than physically separate as shown. Further, those skilled persons will realize that the resource controller and the resource monitor may be implemented in hardware, software, or some combination of both.

The resource controller 14 processes a stream of arriving messages 18 from clients into a stream of resource allocated messages 20. The resource allocated messages are passed on to the server. It is important to note that there is a practical limit to the number of messages in the stream of arriving messages 18 for a given time interval. That is, only a finite number of messages can be captured for processing by the resource control system. Any messages that are sent by clients but do not become part of the stream of arriving messages are referred to as refused connections. Refused connections often result in aborted sessions. Refused connections are handled according to the applicable protocol.

The server 12 represents any server that processes request messages using a stateless protocol in which clients do not establish persistent sessions with the server. In one embodiment, the server is a web server that processes request messages from web clients using the HTTP. In another embodiment, the server is an NFS server that processes request messages from NFS clients using the NFS protocol. In other embodiments, the server may be adapted to the IP, the UDP, or the SMTP, to name a few examples.

The server 12 includes resources (not shown) that are involved in the servicing of the arriving messages 18. These resources include, for example, one or more processors or central processing units (CPUs), various types of memory and storage subsystems, and network communication subsystems. Those of ordinary skill in the art will realize that there are any number of resources that influence the quality of service that one may want to monitor or control, or both.

The resource monitor 16 scrutinizes the utilization of the resources in the server 12 that are involved in the servicing of the resource allocated messages 20 and provides the resource controller 14 with indications of the utilization of the resources. These indications or metrics inform the resource controller of whether sufficient resources are available in the server to provide an adequate level of service to the sessions.

In one embodiment, the resource monitor 16 measures the CPU utilization in the server 12. In another embodiment, the resource monitor measures the utilization of the network pathway for the resource allocated messages 20 to the server. In a further embodiment, the resource monitor measures the utilization of a storage subsystem, such as a disk drive, of the server. In yet another embodiment, the resource monitor generates a combined metric for use by the resource controller 14 that takes into account a number of the above metrics.

The resource controller 14 receives the stream of arriving messages 18 which are targeted for the server. Each of the arriving messages specifies a client request for the server. Each client request implies an action to be taken by the server in accordance with the predetermined communication protocol which the server processes.

The resource controller 14 processes individual ones of the arriving messages 18 based upon the indications provided by the resource monitor 16 and a determination of which session the arriving messages corresponds to with the server 12. In one embodiment, a session list 22 identifies any session underway between the server and a requesting client. The resource controller compares client source indications contained in the arriving messages to entries in the session list to determine whether the arriving messages correspond to sessions underway. In another embodiment, the resource controller determines whether the arriving messages correspond to sessions underway by determining whether valid transaction identifiers are contained in the arriving messages. For any arriving message that does not already correspond to a session underway, the resource controller establishes a new session in the session list for that message.

The server 12 receives and processes each of the resource allocated messages 20 in the order received at the server. A stream of completed messages 24 represents the actions taken by the server in response to the resource allocated messages. For example, the completed messages may contain response information to be transported to the requesting clients that originated the corresponding resource allocated messages.

Figure 2:
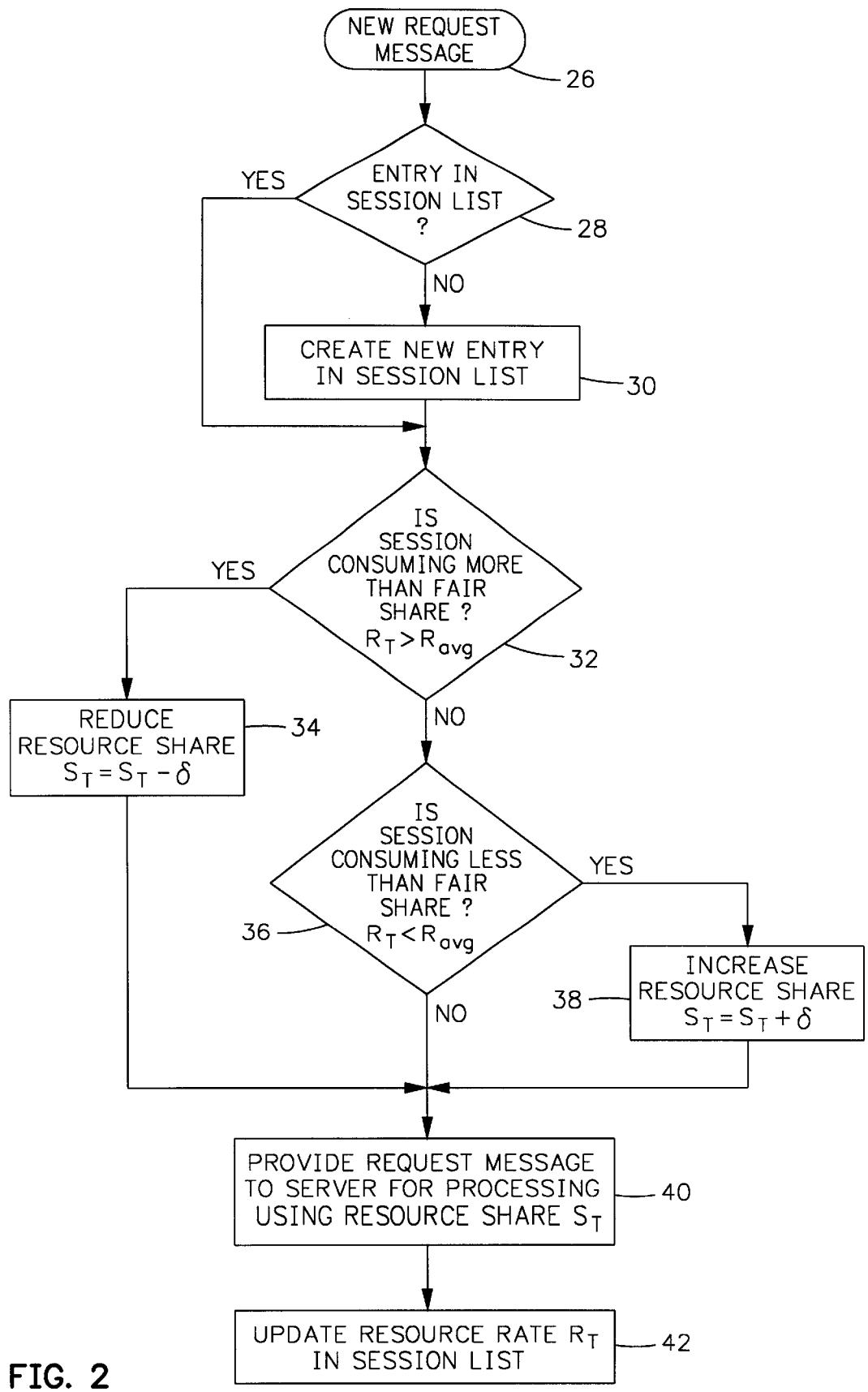
FIG. 2 is a flow diagram of the processing of arriving messages by the resource controller in one embodiment of the present invention.

Turning now to FIG. 2, a flow diagram of the processing of the arriving messages 18 by the resource controller 14 in one embodiment of the present invention is shown. The arriving messages include a new request message, and processing begins at block 26. At decision block 28, the resource controller 14 examines a client source indication in the new request to determine whether the new request corresponds to an entry in the session list 22. If the new request corresponds to a session that is identified in the session list, then processing proceeds to decision block 32.

In one embodiment, the client source indication is an IP address in the new request message that specifies its source. Correspondingly, the entries in the session list 22 contain the IP addresses of clients of the server 12 that are involved in sessions. The resource controller 14 compares the IP address contained in the new request to the IP addresses stored in the session list 22 at decision block 28. If a match is detected then processing proceeds to decision block 32.

In another embodiment, the client source indication is a transaction identifier in the new request message. Correspondingly, the entries in the session list 22 contain transaction identifiers. At decision block 28, the resource controller 14 determines whether a transaction identifier is contained in the new request and compares that transaction identifier, if present, to the transaction identifiers stored in the session list 22 and processing proceeds to decision block 32 if a match is detected.

Returning to decision block 28, if the new request message does not correspond to a session identified in the session list 22 then processing proceeds to block 30 where the resource controller 14 creates a new session entry in the session list 22. Thereafter, processing proceeds to decision block 32.

In one embodiment at block 30, the resource controller 14 creates a new session entry in the session list 22 and writes the IP address of the new request message into the new entry of the session list. In another embodiment, the resource controller creates a new entry and writes a new transaction identifier into the new entry of the session list 22. The new transaction identifier may be returned to the requesting client that originated the request as a "cookie" or may be returned to the requesting client in a hidden field of an HTTP form.

The entries in the session list 22 identifying sessions remain valid until the end of the corresponding session. A session ends and the corresponding entry in the session list is cleared when a new client request message corresponding to that session is not received by the resource controller 14 during a predetermined time-out interval. In addition, a session ends at a point in the session defined by the server 12. For example, if the server is a web server which provides an item purchase function then the session ends and its entry is cleared from the session list 22 when a message is received from the client indicating the confirmation of the purchase.

Continuing with decision block 32, the resource controller 14 determines whether the session corresponding to the new request message is consuming more than its fair share of resources. Recall from above that any one of a number of resources that effect quality of service may be of interest and there may be more than one. For each session, the resource monitor 16 determines an empirical resource rate $R_{emp}$ which is the rate at which the session is consuming the resource for that time interval. This value is communicated to the resource controller 14 where it is used to calculate a resource rate $R_T$ for that session. Preferably, the resource rate will be a moving average of all of the empirical resource rates for that session. The moving average may be from the beginning of the session or only over a portion of the requests. Those of ordinary skill in the art will realize that other resource rates are also possible. The resource controller 14 calculates a standard resource rate against which to compare in determining whether a session is receiving its fair share of resources. Preferably, this standard is an average resource rate $R_{avg}$ which is the average of each of the individual resource rates of the active sessions. Those of ordinary skill in the art will realize that other standards are also possible. If multiple resources are of interest, then each session will have a resource rate for each resource and each resource will have an average resource rate. Any or all of these values may be stored in the session list 22. In block 30 above, new sessions preferably have their resource rate initialized as the average resource rate for purposes of beginning processing because no empirical resource rate history exists for that session.

If at decision block 32, the resource controller 14 determines that the session corresponding to the new request message is consuming more than its fair share of resources, that is, $R_T$ is greater than $R_{avg}$, then processing transfers to block 34. In block 34, the resource controller 14 reduces a resource share $S_T$ assigned to that session by a predetermined amount $\delta$. The resource share is the portion of resources assigned to that session for processing of the request in the server 12. The predetermined amount depends in part on what resource is of interest. If multiple resources are of interest, then each session will have a resource share for each resource, each resource will have a predetermined amount, and each resource will have an average resource share $S_{avg}$. The average resource share is the average of each of the individual resource shares of the active sessions. Those of ordinary skill in the art will realize that other average resource shares are also possible. The predetermined amount $\delta$ may be a constant or it may be a function of $R_T$, $R_{avg}$, $S_T$, $S_{avg}$, and time. Any or all of these values may be stored in the session list 22. In block 30 above, new sessions preferably have their resource shares initialized as the average resource share for purposes of beginning processing because no empirical resource share history exists for that session. Thereafter, processing proceeds to block 40.

If at decision block 32, the resource controller 14 determines that the session corresponding to the new request message is not consuming more than its fair share of resources, then processing transfers to decision block 36. If at decision block 36, the resource controller 14 determines that the session is consuming less than its fair share of resources, that is, $R_T$ is less than $R_{avg}$, then processing transfers to block 38. In block 38, the resource controller 14 increases the resource share $S_T$ assigned to that session by a predetermined amount $\delta$. Thereafter, processing proceeds to block 40. If at decision block 36, the resource controller 14 determines that the session is not consuming less than its fair share of resources, that is, the session is consuming exactly its fair share, then processing transfers to block 40.

At block 40, the resource controller 14 provides the new request message to the server 12 for processing by passing the request on to the server as one of the resource allocated messages 20. The server in turn processes the request message using the resource share $S_T$ assigned by the resource controller and generates a result that is passed on to the client as one of the completed messages 24. During processing, the resource monitor 16 determines the empirical resource rate $R_{emp}$ for that request and communicates this to the resource controller. Then in block 42, the resource controller uses the empirical resource rate to update the resource rate $R_T$ for that session in the session list 22.

For one example of the present invention, assume that the resource of interest is CPU utilization. In that case, the resource rate $R_T$ might be the average CPU utilization over the last time interval for a session. Most operating systems provide a means for the resource monitor 16 to measure the CPU utilization in the server 12 by each process or thread. This measurement can be used as the empirical resource rate $R_{emp}$ by the resource monitor which is reported to the resource controller 14 to update the resource rate. Additionally, most operating systems provide a means for assigning a priority level to a process or thread where the greater the priority then the greater the share of resources provided. This priority level can be used as the resource share $S_T$ by the resource controller to regulate the CPU utilization in the server. The predetermined amount $\delta$ would then be whatever value is necessary to raise or lower the priority level by one or more levels.

Figure 3:
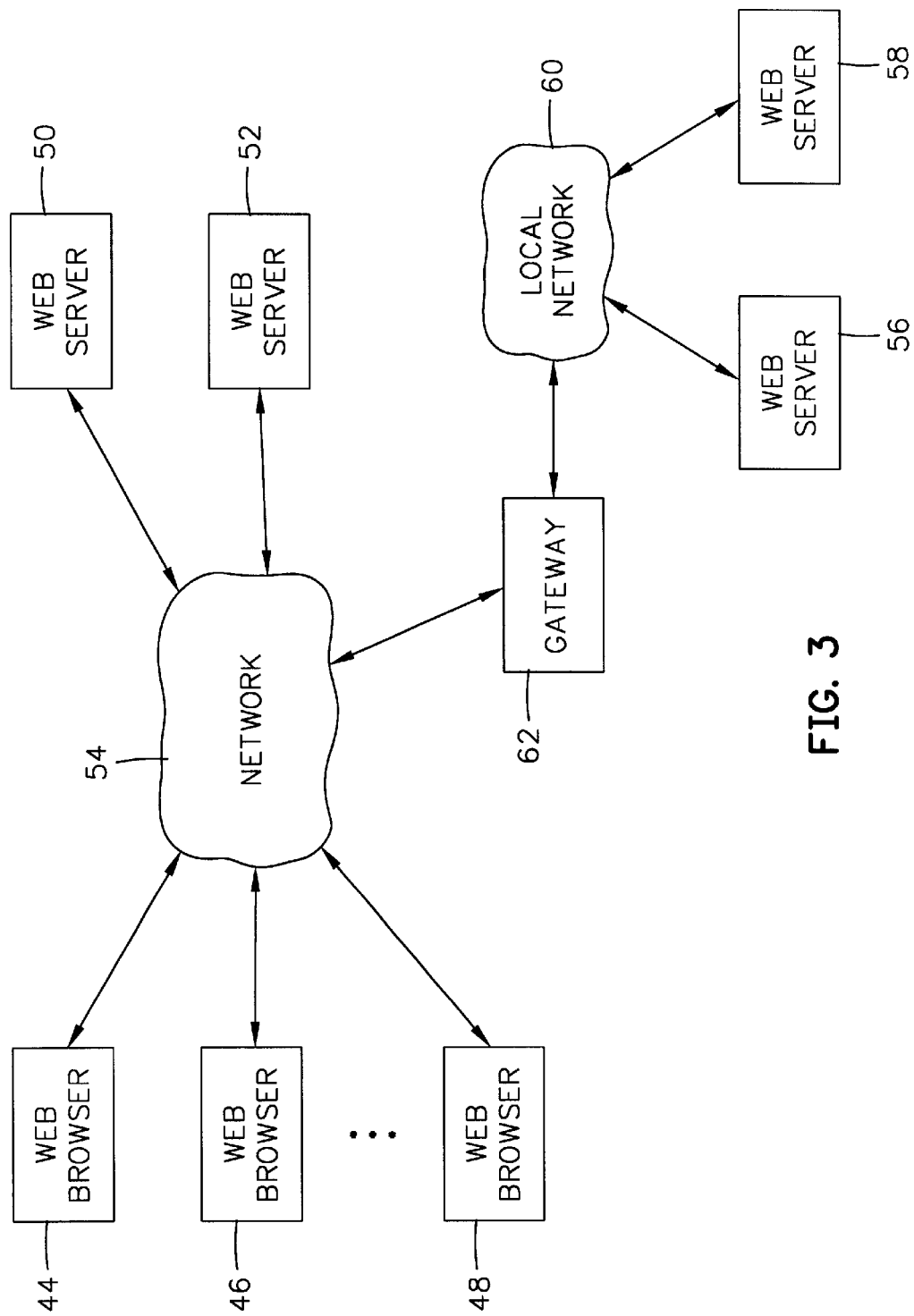
FIG. 3 is a block diagram of example configurations of web servers that employ the resource control techniques of the present invention.

Turning now to FIG. 3, a block diagram of example configurations of web servers that employ the resource control techniques of the present invention are shown. A set of web browsers 44, 46, and 48, and a pair of web servers 50 and 52 are shown coupled for communication via a network 54. In addition, a pair of web servers 56 and 58 are shown coupled for communication over a local network 60. A gateway 62 enables communication between the network 54 and the local network 60.

The web browsers 44, 46, and 48 transfer HTTP requests via the network 54 and are potential web clients to the web servers 50, 52, 56, and 58. Each HTTP request from the web browsers 44, 46, and 48 contains a Universal Resource Locator (URL), referred to as an "address," that targets one of the web servers 50, 52, 56, and 58. The network 54 routes each HTTP request to either the web server 50 or 52, or the gateway 62, depending on the particular URL contained in the request.

The web server 50 is augmented with software elements that provide functionality of the resource controller 14 and the resource monitor 16. The web server 52 may be a mirror site to the web server 50 or may implement special web server software for handling any deferred client requests from the web server 50. The resource monitor 16 in the web server 50 may employ the services of an operating system under which it executes to obtain metrics such as CPU, network, or storage subsystem utilization.

In one embodiment, the web server 50 generates transaction identifiers to identify any of the web browsers 44, 46, and 48 to which sessions are underway. The web server 50 may transfer the transaction identifiers to the web browsers 44, 46, and 48 as cookies in response messages to the web browsers. The cookies may be encoded and may have an expiration date and time. The web browsers 44, 46, and 48 include the cookies which they were assigned in subsequent request messages to the web server 50 and the resource controller 14 examines these cookies when determining what level of resources to allocate to the subsequent request messages.

Alternatively, the web server 50 may transfer transaction identifiers to the web browsers 44, 46, and 48 as hidden fields in forms contained in completed messages to the web browsers. The web browsers submit the forms including hidden fields with subsequent request messages to the web server 50 and the resource controller 14 examines these hidden fields contained in submitted forms when deciding what level of resources to allocate to the subsequent request messages.

The gateway 62 functions as a communication gateway between the network 54 and the local network 60 that connects to the web servers 56 and 58. The web servers 56 and 58 each may provide a different web server function. Alternatively, the web servers 56 and 58 taken together may provide a single web server function.

The gateway 62 is augmented with software elements that provide the functionality of the resource controller 14 and the resource monitor 16. The resource monitor in the gateway 62 monitors the resources of both of the web servers 56 and 58 via the local network 60. The resource controller in the gateway 62 receives arriving messages targeted for the web servers 56 and 58 from the web browsers 44, 46, and 48. The resource controller in the gateway 62 determines the proper resource allocation and relays the resource allocated messages on to the appropriate one of the web servers 56 and 58.

The web browsers 44, 46, and 48 may be embodied as separate computer systems that execute web browser software or as one computer system executing multiple web browser applications or any combination thereof. The web browsers may be also be embodied as network computers with web browser capability or television components with web browsing capability.

Figure 4:
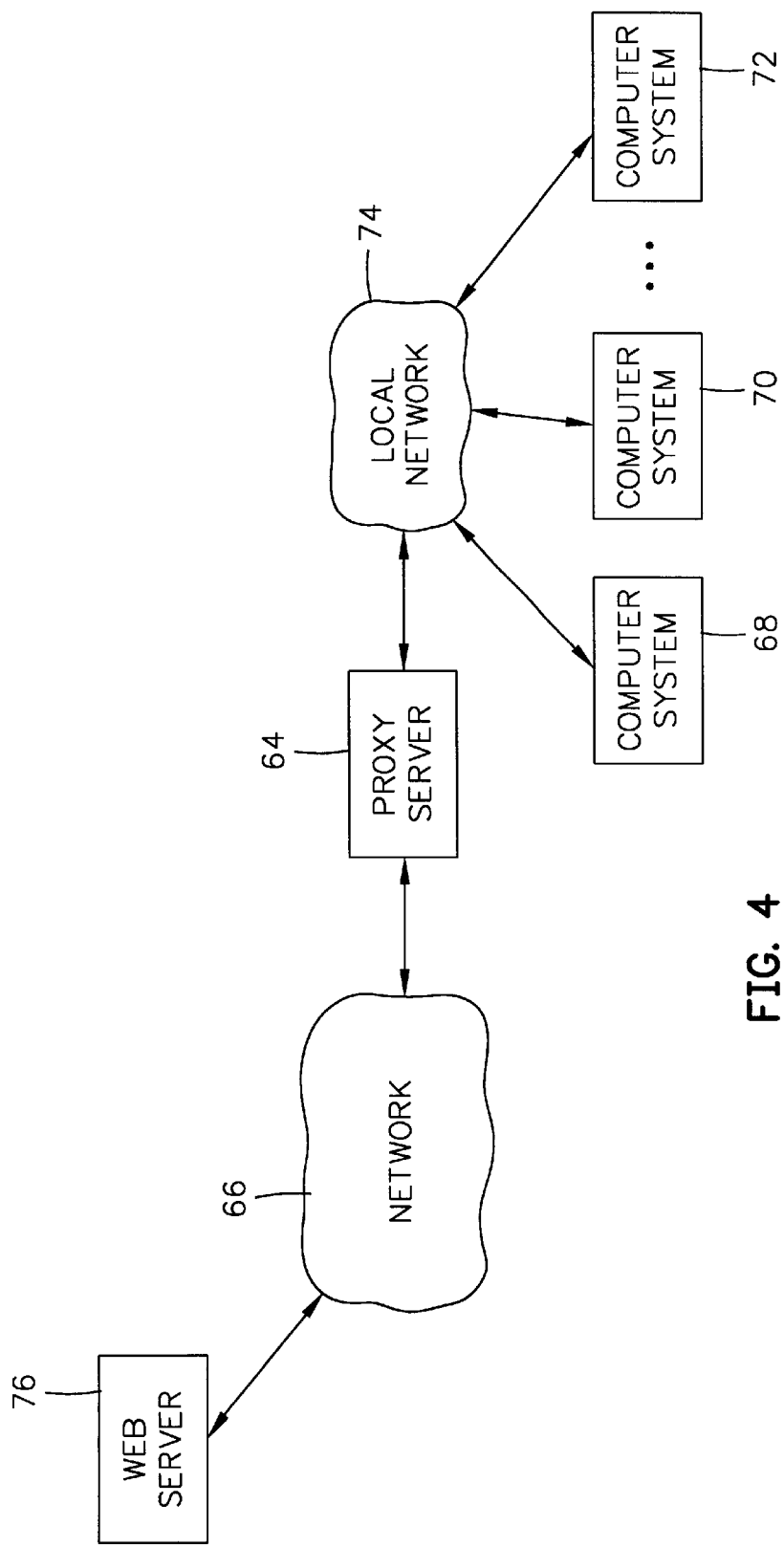
FIG. 4 is a block diagram of the application of the resource control techniques of the present invention to a proxy server.

Turning now to FIG. 4, a block diagram of the application of the resource control techniques of the present invention to a proxy server is shown. The proxy server 64 enables access to a network 66 by a set of computer systems 68, 70, and 72 coupled to a local network 74. For example, the network 66 may represent the world-wide-web of the Internet that enables access to a web server 76 and the computer systems 68, 70, and 72 may belong to a large organization and be connected via an internal organization network or local area network.

The proxy server 64 receives a stream of client request messages from the computer systems 68, 70, and 72 which are targeted for destinations on the network 66 such as the web server 76.

The proxy server 64 maintains a session list 22 that identifies the sessions which each of the computer systems 68, 70, and 72 have underway with a destination on the network 66. In one embodiment, the session list 22 in the proxy server 64 records network addresses on the local network 74 for the computer systems 68, 70, and 72.

The proxy server 64 also contains a resource monitor 16 for monitoring the CPU and storage subsystem utilization in the proxy server, the network utilization in the proxy server, and the network utilization on both the network 66 side and the local network 74 side. The proxy server also contains a resource controller 14 that determines the proper resource allocation and passes the resource allocated messages from the computer systems 68, 70, and 72 on to the network 66.

While the invention has been illustrated and described by means of specific embodiments, it is to be understood that numerous changes and modifications may be made therein without departing from the spirit and scope of the invention as defined in the appended claims and equivalents thereof.

What is claimed is:

1. A session based resource control system for a stateless server, the system comprising:
 a resource monitor that determines a utilization metric for a set of resources in the server for processing a stream of arriving messages from at least one client; and
 a resource controller configured to determine a resource share for a session associated with a new request message from the stream of arriving messages, wherein said resource controller is configured to determine a resource rate for the resource share of the session, the resource rate being a rate at which the session is consuming resources.

2. The system according to claim 1, wherein the utilization metric comprises network utilization.

3. The system according to claim 1, wherein the utilization metric comprises storage subsystem utilization.

4. The system according to claim 1, wherein the server is a web server.

5. The system according to claim 1, wherein the resource controller is contained in a gateway that enables communication with the server via a local network.

6. The system according to claim 1, wherein the resource controller is contained in a proxy server that enables a set of clients to access a web server via a network.

7. The system according to claim 1, wherein the resource controller is further configured to compare the resource rate with a standard resource rate.

8. The system according to claim 7, wherein the resource controller is further configured to increase the resource share in response to the resource rate being greater than the standard resource rate.

9. The system according to claim 7, wherein the resource controller is further configured to decrease the resource share in response to the resource rate being lesser than the standard resource rate.

10. A method of session based resource control for a stream of arriving messages from at least one client to resource control system comprising a server, a resource monitor, and a resource controller, the method comprising:

determining a utilization metric for a set of resources in the server for processing the stream of arriving messages;

determining a resource share for a session in response to a new request message in the stream of arriving messages;

determining a rate of use of at least one of the set resources for a plurality of time intervals;

calculating a resource rate of the session from the rate of use of the at least one of the set resources for the plurality of time intervals; and relaying to the server the messages in the stream of arriving messages as a stream of resource allocated messages.

11. A session based resource control system for a server, the system comprising:

means for determining a utilization metric for a set of resources in the server for processing a stream of arriving messages from at least one client;

means for determining a resource share for a session in response to a new request message in the stream of arriving messages;

means for determining a rate of use of at least one of the set resources for the plurality of time intervals;

means for calculating a resource rate of the session from the rate of use of the at least one of the set resources for a plurality of time intervals; and means for relaying to the server the messages in the stream of arriving messages as a stream resource allocated messages.

12. The system according to claim 11, wherein the utilization metric comprises CPU utilization.

13. The system according to claim 11, wherein the utilization metric comprises network utilization.

14. The system according to claim 11, wherein the utilization metric comprises storage subsystem utilization.

15. A resource controller for a session based resource control system comprising a stateless server and a resource monitor that determines a utilization metric for a set of resources in the server for processing a stream of arriving messages from at least one client, the controller comprising:

means for determining a resource share for a session whereby the session receives a fair share of the set of resources from the server, wherein the resource share is an amount of utilization for each of the resources in the set of resources assigned to the session; and means for relaying to the server the messages in the stream of arriving messages as a stream of resource allocated messages.

16. The controller according to claim 15, wherein the utilization metric comprises CPU utilization.

17. The controller according to claim 15, wherein the utilization metric comprises network utilization.

18. The controller according to claim 15, wherein the utilization metric comprises storage subsystem utilization.

19. A method of session based resource control for a stream of arriving messages containing at least one request message from at least one client to a resource control system comprising a server, a resource monitor, and a resource controller, the method comprising:

determining which session the at least one request message is associated with in the stream of arriving messages;

determining a resource rate for the session associated with the at least one request message for a set of resources of the server;

determining a resource share for the session based on the resource rate of the session whereby the session receives a fair share of the set of resources from the server; and relaying to the server the messages in the stream of arriving messages as a stream of resource allocated messages.

20. The method according to claim 19, wherein the step of determining a resource share comprises the steps of:

determining when the resource rate of the session is greater than a standard resource rate;

reducing the resource share by a predetermined amount when the resource rate is greater than the standard resource rate;

determining when the resource rate of the session is less than the standard resource rate; and increasing the resource share by a predetermined amount when the resource rate is less than the standard resource rate.

21. The method according to claim 20, further comprising the steps of:

determining an empirical resource rate for the session for a set of resources of the server; and updating the resource rate of the session based on the empirical resource rate.

22. A method of session based resource control for a stream of arriving messages, the method comprising:

determining a utilization metric for a set of resources in a server for processing the stream of arriving messages;

creating a new session entry in a session list for a new request message if the new request message does not correspond to a session identified in the session list; and determining a resource share for the new session based on resource rates of existing sessions, wherein the new session receives a fair share of the set of resources from the server.

23. A session based resource control system for a server, the system comprising:

a resource monitor that determines a utilization metric for a set of resources in the server for processing a stream of arriving messages from at least one client; and a resource controller that determines a resource share of a session for a new request message from the stream of arriving messages, wherein the resource share is based on a resource rate of the session, and wherein the resource controller creates a new session entry in a session list if the new request message does not correspond to a session identified in the session list and the resource controller calculates a resource share for the new session based on resource rates for existing sessions.

* * * * *